(12) United States Patent
Akagi

(10) Patent No.: US 10,554,847 B2
(45) Date of Patent: Feb. 4, 2020

(54) IMAGE READING APPARATUS AND IMAGE READING METHOD

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/283,334

(22) Filed: Feb. 22, 2019

(65) Prior Publication Data

US 2019/0273836 A1 Sep. 5, 2019

(30) Foreign Application Priority Data

Mar. 1, 2018 (JP) .................................. 2018-036336

(51) Int. Cl.
*H04N 1/04* (2006.01)
*H04N 1/028* (2006.01)
*H04N 1/00* (2006.01)

(52) U.S. Cl.
CPC ..... *H04N 1/02855* (2013.01); *H04N 1/00896* (2013.01); *H04N 1/02885* (2013.01)

(58) Field of Classification Search
None
See application file for complete search history.

(56) References Cited

U.S. PATENT DOCUMENTS

| 6,229,627 B1 * | 5/2001 | Taguchi | H04N 1/401 358/461 |
| 2017/0331983 A1 | 11/2017 | Ishido et al. | H04N 1/58 |
| 2018/0288237 A1 | 10/2018 | Akagi | H04N 1/0071 |

FOREIGN PATENT DOCUMENTS

JP H10-257209 9/1998

* cited by examiner

*Primary Examiner* — Cheukfan Lee
(74) *Attorney, Agent, or Firm* — Venable LLP

(57) ABSTRACT

An image reading apparatus includes: a reading unit configured to read an image of an original and output an image signal; and a white reference plate to be used for shading correction. The image reading apparatus drives the reading unit with maximum power consumption for a predetermined time period and thereafter drives the reading unit with reduced power consumption. The image reading apparatus causes the reading unit with reduced power consumption to read the white reference plate and generates shading data to be used for the shading correction. After that, the image reading apparatus causes the reading unit to read an original and corrects a reading result of the original based on the shading data.

18 Claims, 6 Drawing Sheets

IMAGE READING APPARATUS AND IMAGE READING METHOD

BACKGROUND OF THE INVENTION

Field of the Invention

The present disclosure relates to an image reading apparatus configured to read an image formed on an original (hereinafter referred to as "original image").

Description of the Related Art

An image reading apparatus reads an original image by irradiating an original with light emitted from a light source and reading reflected light with an image sensor. The original, for example, is placed on a platen glass of the image reading apparatus, with a surface of the original to be read being oriented downward. In this case, the image reading apparatus reads an original image by scanning a lower portion of the platen glass in one direction. Moreover, the image reading apparatus reads an original image of an original being conveyed through use of an automatic document feeder (ADF) configured to convey an original.

An image sensor provided in the image reading apparatus includes a plurality of light-receiving elements arrayed along a width direction of an original. The light-receiving elements have variation in sensitivity. When an original image is read without correcting the variation in sensitivity, a read image may have roughness, or may be changed in color tone. In order to accommodate such degradation in image quality of the read image due to the variation in sensitivity of the light-receiving elements, the image reading apparatus performs shading correction. The shading correction is a technology of reading a white reference plate, which is provided at a position different from a reading position for an original and serves as a reference of colors, before reading an original, and then correcting the variation in sensitivity of the light-receiving elements in accordance with a reading result.

The shading correction includes black shading and white shading. The black shading is performed by reading the white reference plate without turning on the light source. The white shading is performed by reading the white reference plate with the light source turned on. The black shading is the shading correction which is performed under a state in which the light-receiving elements do not receive the light. The black shading corrects variation in dark-time output (hereinafter referred to as "dark level") of the light-receiving elements of the image sensor. The white shading corrects light amount distribution characteristics of the light source in addition to the variation in sensitivity of the light-receiving elements. Moreover, when optical components, such as a lens and a mirror, configured to introduce the reflected light to the light-receiving elements are provided, the white shading further corrects, for example, unevenness in reflectance of the optical components. In general, the white shading is performed after the dark levels of the light-receiving elements are corrected by the black shading.

The dark level and the sensitivity of each of the light-receiving elements of the image sensor change depending on temperature. The light-receiving elements may have individual differences in such temperature characteristic. Therefore, in a case where the temperature of the image sensor differs at the timing of performing the shading correction and at the timing of reading an original, even when the variation in sensitivity of the light-receiving elements is corrected by the shading correction, the variation in sensitivity may appear at the time of reading an original. In this case, there is a fear of causing degradation in image quality of a read image. In Japanese Patent Application Laid-open No. Hei 10-257209, there is disclosed an image reading apparatus configured to detect an output level of an image sensor and change power consumption of the image sensor in accordance with the detected output level. The image reading apparatus changes the power consumption of the image sensor to stabilize the temperature of the image sensor and suppress degradation in image quality.

In recent years, image sensors have been remarkably increased in reading speed. Therefore, in order to detect the output level of the image sensor in real time, a large-scale circuit is required. Such large-scale circuit causes an increase in size and cost of the apparatus. In view of the above-mentioned circumstances, there is a demand for an image reading apparatus capable of performing the shading correction in accordance with the change in temperature without requiring the circuit for detecting the output level. The present disclosure has been made in view of the problem described above, and has an object to provide an image reading apparatus capable of suppressing degradation in image quality of a read image due to fluctuation in temperature.

SUMMARY OF THE INVENTION

An image reading apparatus according to the present disclosure includes: a light source configured to irradiate an original with light; an image sensor configured to receive light reflected on the original and output an image signal representing an original image of the original; a reference member for shading correction; a shading portion configured to perform the shading correction on the image signal through use of shading data acquired from a result of reading the reference member with the image sensor; a power consumption controller configured to control power consumption of the image sensor; and a controller configured to control operations of the light source and the image sensor to read the reference member and an original image of the original, wherein the controller is configured to: cause the power consumption controller to drive the image sensor with a first power consumption during a preparation period before the controller causes the image sensor to read the reference member and thereafter drive the image sensor with a second power consumption smaller than the first power consumption, and allow the image sensor driven with the second power consumption to read the reference member; and cause the image sensor driven with the second power consumption to read an original image of the original.

Further features of the present invention will become apparent from the following description of exemplary embodiments (with reference to the attached drawings).

DESCRIPTION OF THE EMBODIMENTS

Now, an embodiment of this disclosure is described in detail with reference to the drawings.

Figure 1:
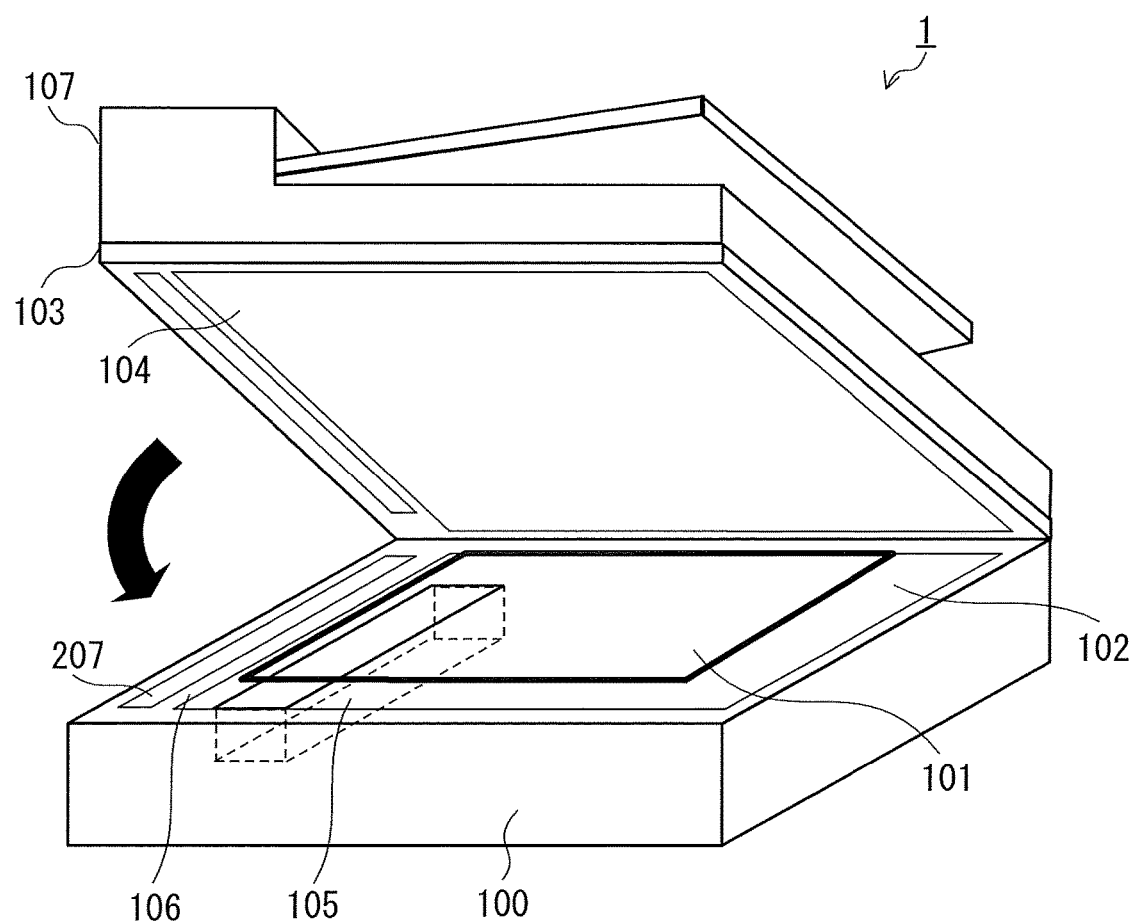
FIG. 1 is a configuration view of an image reading apparatus.

FIG. 1 is a configuration view of an image reading apparatus according to this embodiment. The image reading apparatus 1 includes an apparatus main body 100 and a cover 103. The cover 103 is mounted to the apparatus main body 100 so as to be openable and closable. In FIG. 1, the cover 103 is in a state of being opened with respect to the apparatus main body 100.

The apparatus main body 100 includes a platen glass 102 configured to receive an original 101, which is to be read, to be placed thereon. The cover 103 is provided so that the platen glass 102 can be covered from an upper portion thereof. The cover 103 is turned about one side thereof so as to be opened or closed with respect to the platen glass 102. On a surface of the cover 103 on the platen glass 102 side, there is provided a white platen cover 104. The platen cover 104 is configured to press the original 101, which is placed on the platen glass 102, under a state in which the cover 103 is closed. The apparatus main body 100 includes a flow reading glass 207, which is provided on the same surface as the platen glass 102. In the apparatus main body 100, at a position corresponding to a frame 106 provided between the platen glass 102 and the flow reading glass 207, there is provided a white reference plate being a reference member to be used for shading correction.

In the apparatus main body 100, at a position below the platen glass 102, there is provided a reader 105 configured to read an original image. The reader 105 is an optical sensor having a substantially rectangular-parallelepiped shape, and is configured to read an original image from the original 101 along a longitudinal direction of the reader 105 as a main scanning direction. When the original 101 placed on the platen glass 102 is to be read, the reader 105 starts irradiation with light, and reads the original 101 while being moved by a motor (not shown) in a sub-scanning direction orthogonal to the main scanning direction.

The cover 103 includes an original conveyor 107. The original conveyor 107 is configured to convey the original to the flow reading glass 207 under the state in which the cover 103 is closed. When the reader 105 reads an original conveyed to the flow reading glass 207 by the original conveyor 107, the reader 105 reads the conveyed original without moving from a position directly below the flow reading glass 207.

Figure 2:
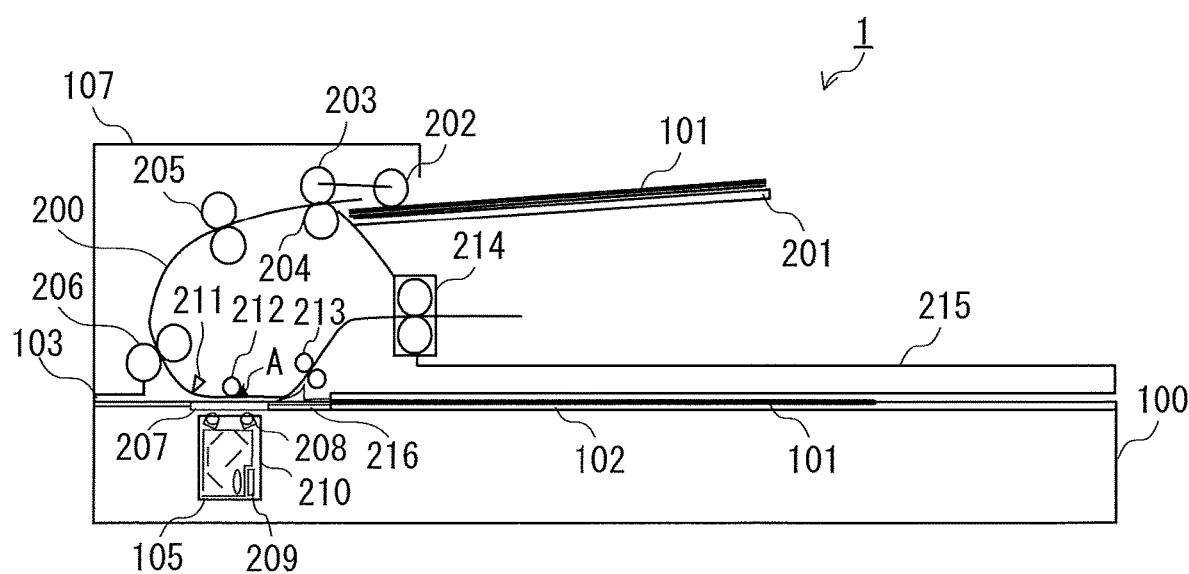
FIG. 2 is an internal configuration view of an image reading apparatus.

FIG. 2 is an internal configuration view of the image reading apparatus 1. In FIG. 2, the cover 103 is in a state of being closed with respect to the apparatus main body 100.

The original conveyor 107 includes a tray 201, a conveyance passage 200, and a delivery tray 215. The tray 201 is configured to receive the original 101 to be placed thereon. The conveyance passage 200 is configured to convey the original 101. The delivery tray 215 is configured to receive the original 101 to be delivered thereto after image reading. The tray 201 is capable of receiving a plurality of originals 101 to be placed thereon. The conveyance passage 200 includes a pickup roller 202, separation rollers 203 and 204, front conveyance rollers 205, lead rollers 206, a pressing roller 212, rear conveyance rollers 213, and delivery rollers 214.

The pickup roller 202 is configured to feed the originals 101 to the conveyance passage 200 sequentially from the top of the originals placed on the tray 201. The pickup roller 202 feeds the original using only a friction force generated on a surface thereof. Thus, there is a case in which the pickup roller 202 simultaneously feeds a plurality of originals depending on a friction coefficient of the original. In order to prevent the simultaneous feeding of the plurality of originals, the separation rollers 203 and 204 separate the originals one by one. For example, the separation roller 203 rotates in a direction of conveying the originals, and the separation roller 204 does not rotate, thereby separating the originals one by one.

The separation rollers 203 and 204 are configured to convey the separated original 101 to the front conveyance rollers 205. The front conveyance rollers 205 are a pair of rollers, and are configured to convey the original 101 to the lead rollers 206. The lead rollers 206 are a pair of rollers, and are configured to convey the original 101 to a reading position A, at which the original 101 is to be read by the reader 105. The reading position A is located above the flow reading glass 207 when the cover 103 is in the state of being closed. The reader 105 reads an original image of the original 101, which is conveyed through the reading position A, through intermediation of the flow reading glass 207. On upstream of the reading position A in the conveyance direction of the original 101, there is provided an original-leading-edge detection sensor 211 configured to detect a leading edge of the original 101 in the conveyance direction. The reader 105 starts reading the original image after elapse of a predetermined time period from the timing at which the original-leading-edge detection sensor 211 detects the leading edge of the original 101.

The pressing roller 212 is provided at the reading position A. There is a case in which the original 101 floats from the conveyance passage 200 during the conveyance. When the original 101 floats from the conveyance passage 200 at the reading position A, the original 101 is shifted from a focal point position of the reader 105. In this case, the read original image becomes darker. In order to prevent such shifting of the original 101 from the focal point position, the pressing roller 212 presses the original 101 against the conveyance passage 200 at the reading position A.

The rear conveyance rollers 213 are a pair of rollers, and are configured to convey the original 101, which has passed through the reading position A, to the delivery rollers 214. The delivery rollers 214 are a pair of rollers, and are configured to deliver the original 101 to the delivery tray 215. The delivery tray 215 receives the original 101 after reading.

The reader 105 provided inside the apparatus main body 100 includes a light emitter 208 serving as a light source, an image sensor 209, and an optical component group 210. The light emitter 208 includes light emitting elements, for example, light emitting diodes (LEDs), and is configured to irradiate the original 101 with line-shaped light along the main scanning direction. The light radiated onto the original 101 is reflected, and then is introduced to the image sensor 209 by the optical component group 210. The image sensor 209 is a line sensor including a plurality of light-receiving elements arrayed in a line shape along the main scanning direction. The plurality of light-receiving elements correspond to pixels along the main scanning direction. The reflected light reflected on the original 101 and introduced by the optical component group 210 forms an image on a light receiving surface of each of the light-receiving elements. Each of the light-receiving elements outputs an electric signal being an analog value corresponding to the received reflected light. This electric signal represents, for example, a brightness value of each of the pixels arrayed in the main scanning direction. Electric signals of all of the light-receiving elements represent brightness values for one line of the original image in the main scanning direction. The image sensor 209 outputs image signals representing one line of the original image in accordance with the electric signals. Such reading processing is performed in the same manner for both the case of reading the original 101 placed on the platen glass 102 and the case of reading the original 101 conveyed to the reading position A, and whether or not the reader 105 moves in the sub-scanning direction is the only difference. The reader 105 waits at a home position when the reading processing is not performed. The home position is set, for example, at a position directly below the flow reading glass 207 (reading position A).

As described above, the white reference plate 216 is provided inside the apparatus main body 100 between the flow reading glass 207 and the platen glass 102. The white reference plate 216 is a reference member which is to be used at the time of acquiring shading data for shading correction.

Figure 3:
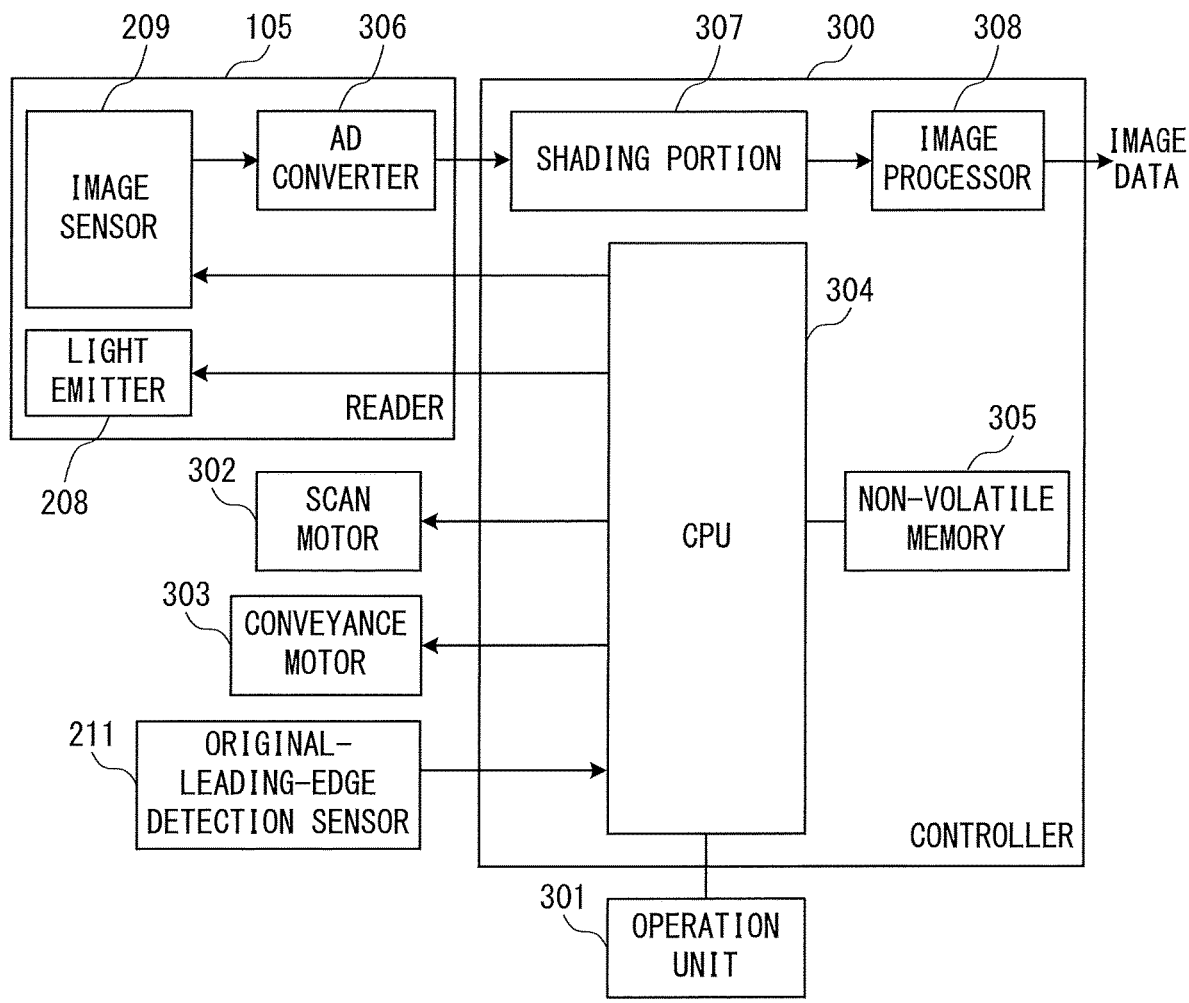
FIG. 3 is an explanatory diagram for illustrating a controller.

FIG. 3 is an explanatory diagram for illustrating a controller configured to control an operation of the image reading apparatus 1. The controller 300 is provided in, for example, the apparatus main body 100. The controller 300 is connected to an operation unit 301, a scan motor 302, a conveyance motor 303, the original-leading-edge detection sensor 211, and the reader 105.

The operation unit 301 is a user interface, and is configured to receive various instructions or setting input given by a user. For example, in response to an operation by a user, the operation unit 301 inputs a reading start instruction for an original image to the controller 300. The scan motor 302 is a drive source configured to move the reader 105 in the sub-scanning direction at the time of reading the original 101 placed on the platen glass 102. The conveyance motor 303 is a drive source configured to drive various rollers, which are provided to the conveyance passage 200, to rotate. The conveyance motor 303 may be provided for each of the rollers so that the rollers can be individually controlled. The original-leading-edge detection sensor 211 is configured to input a detection result with regard to detection of an original leading edge to the controller 300.

The controller 300 includes a central processing unit (CPU) 304, a non-volatile memory 305, a shading portion 307, and an image processor 308. The CPU 304 executes a computer program stored in the non-volatile memory 305 to control the operation of the image reading apparatus 1. The CPU 304 executes the computer program, for example, when the image reading apparatus 1 is turned on.

The CPU 304 acquires the reading start instruction for the original image from the operation unit 301 to start reading the original image. When the original image is to be read from the original 101 placed on the platen glass 102, the CPU 304 controls a reading operation of the reader 105 while moving the reader 105 in the sub-scanning direction through use of the scan motor 302. When the original image is to be read from the original 101 being conveyed by the original conveyor 107, the CPU 304 controls the conveyance motor 303 to cause the original conveyor 107 to convey the original 101. The original-leading-edge detection sensor 211 detects the leading edge of the original 101 being conveyed, and gives a notification as to a detection result to the CPU 304. The CPU 304 acquires the notification to start control of the reading operation of the reader 105.

At the time of controlling the reading operation of the reader 105, the CPU 304 turns on the light emitter 208 and causes the image sensor 209 to output electric signals. The reader 105 includes an analog-digital (AD) converter 306 in addition to the light emitter 208 and the image sensor 209. The AD converter 306 is configured to convert analog electric signals, which are output from the image sensor 209, into digital signals to generate image signals representing the original image. The image signals are input to the shading portion 307.

The shading portion 307 is configured to perform shading correction of correcting, for example, light-amount unevenness of the light emitter 208 and variation in sensitivity of the light-receiving elements of the image sensor 209. For example, one pixel is allocated to each of the light-receiving elements of the image sensor 209. In this case, the shading portion 307 corrects variation in sensitivity for each pixel. The image processor 308 is configured to perform image processing, for example, noise-removal filtering with respect to the image signals having been subjected to the shading correction by the shading portion 307, and generates image data representing the original image. The image data is transmitted to an external device (not shown).

Figure 4:
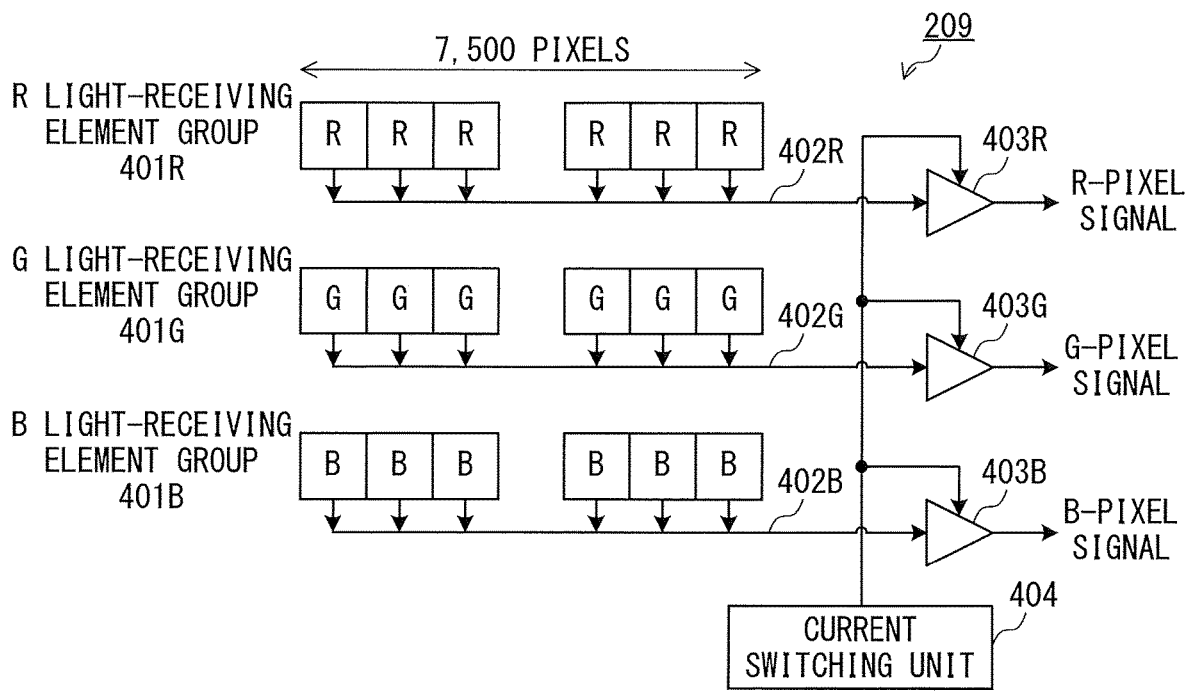
FIG. 4 is an explanatory diagram for illustrating an image sensor.

FIG. 4 is an explanatory diagram for illustrating the image sensor 209. The image sensor 209 includes light-receiving-element groups 401R, 401G, and 401B, which are configured to detect lights of three colors of R (red), G (green), and B (blue), respectively. Through use of the light-receiving-element groups 401R, 401G, and 401B for three colors, the image sensor 209 is capable of reading a color image recorded on the original 101. In this embodiment, the light-receiving elements for respective colors of R, G, and B are provided so that 7,500 light-receiving elements are linearly arrayed for each color. With this, the image sensor 209 is capable of reading an image corresponding to 7,500 pixels.

Each light-receiving element is formed of, for example, a photodiode configured to convert light into an electric charge, and stores an electric charge in accordance with intensity of the received light (reflected light). Horizontal transfer lines 402R, 402G, and 402B and output buffers 403R, 403G, and 403B are provided so as to correspond to the light-receiving-element groups 401R, 401G, and 401B for respective colors. The light-receiving elements for respective colors are connected to the horizontal transfer lines 402R, 402G, and 402B respectively associated therewith. The horizontal transfer lines 402R, 402G, and 402B sequentially transfer the electric charges stored in the light-receiving elements to the output buffers 403R, 403G, and 403B, respectively.

The output buffers 403R, 403G, and 403B convert the electric charges, which have been transferred from each of the light-receiving elements, into voltages, and transfer the voltages as analog electric signals (R-pixel signals, G-pixel signals, and B-pixel signals) to the AD converter 306. With this, the AD converter 306 acquires pixel signals corresponding to the pixels of the original image in the main scanning direction. The output buffers 403R, 403G, and 403B are provided so as to correspond to the respective colors. Thus, the AD converter 306 is capable of simultaneously acquiring pixel signals of one pixel for each color. The AD converter 306 generates the image signals from the acquired pixel signals as described above and transmits the image signals to the controller 300.

The image sensor 209 in this embodiment includes a current switching unit 404. The current switching unit 404 is configured to switch output currents of the output buffers 403R, 403G, and 403B for respective colors in accordance with a current switching instruction given by the CPU 304. In this embodiment, the current switching unit 404 collectively switches the output currents of the output buffers 403R, 403G, and 403B. The output currents of the output buffers 403R, 403G, and 403B directly affect the power consumption of the image sensor 209. That is, the current switching unit 404 performs drive control and power consumption control for the image sensor 209. When the output currents of the output buffers 403R, 403G, and 403B are maximum, the power consumption of the image sensor 209 becomes larger. Therefore, a large amount of heat is generated from the image sensor 209.

(Shading Processing)

Description is made of shading processing performed by the shading portion 307. The shading portion 307 performs the shading processing by two types of shading methods described below. In the two types of shading methods described below, the shading portion 307 generates shading data that is to be used with respect to image signals at the time of performing the shading correction.

Figure 5:
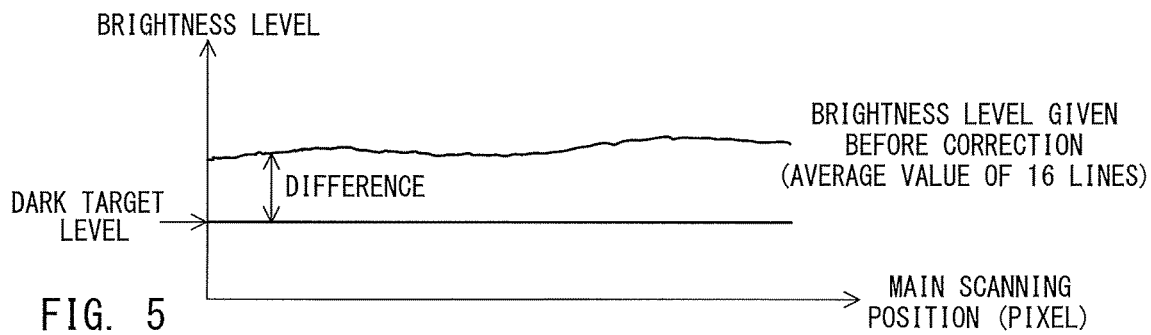
FIG. 5 is an explanatory graph for showing black shading.

The first shading method is black shading of correcting variation in dark level of the light-receiving elements of the image sensor 209. FIG. 5 is an explanatory graph for showing the black shading. For simple description, description is made of image signals for one color. The black shading is performed in the same manner also for each of the other two colors.

The shading portion 307 averages input signals corresponding to sixteen lines in the sub-scanning direction for each of the pixels arrayed in the main scanning direction. The averaging is performed to suppress random fluctuation of the image signals. In this embodiment, a numerical level of each image signal is referred to as "brightness level". Each light-receiving element outputs a signal which becomes larger in brightness level as the intensity of the received light becomes larger. During the black shading, the light emitter 208 is turned off. Therefore, the image signal becomes significantly smaller in brightness level.

The brightness levels given before the black shading are not even due to variation in dark level of the light-receiving elements. Thus, the shading portion 307 compares the averaged brightness level of each pixel given by a corresponding light-receiving element with a preset dark target level, and stores a difference therebetween in a memory (not shown) provided in the shading portion 307. The shading portion 307 performs this operation on the pixels (7,500 pixels) for each of the three colors. Specifically, after the black shading is completed, a difference between the 7,500 pixels for each of the three colors and the dark target can be obtained.

The difference values with respect to the dark target correspond to shading data pieces obtained by the black shading, and are expressed as DRn, DGn, and DBn ("n" corresponds to a position of the pixel in the main scanning direction) for respective colors.

Figure 6:
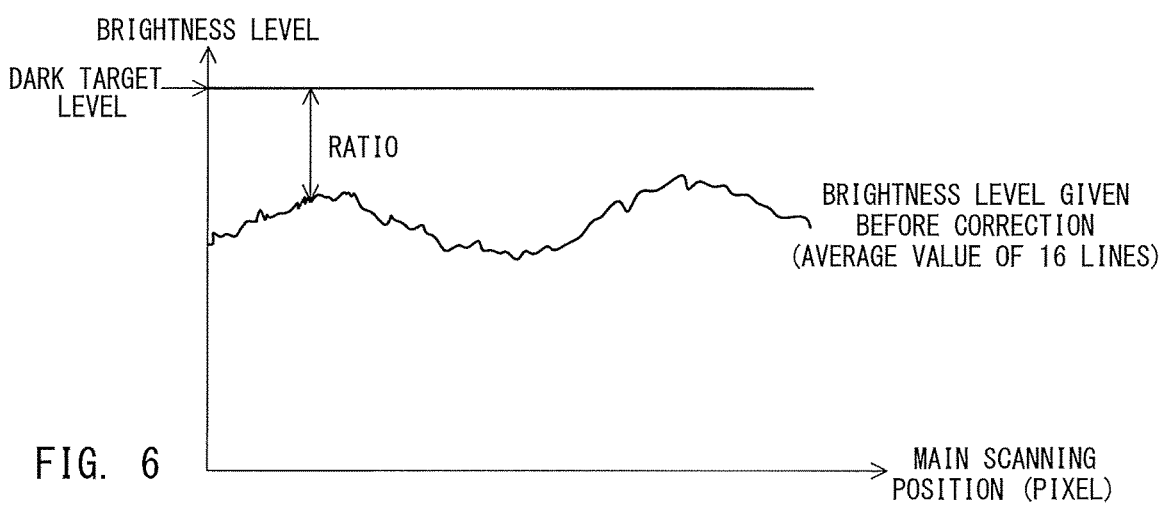
FIG. 6 is an explanatory graph for showing white shading.

The second shading method is white shading of correcting, for example, the light amount distribution characteristics of the light emitter 208 or unevenness in reflectance of the optical component group 210, in addition to variation in sensitivity of the light-receiving elements of the image sensor 209. FIG. 6 is an explanatory graph for showing the white shading. For simple description, description is made of image signals for one color. The white shading is performed in the same manner also for each of the other two colors.

The shading portion 307 averages input signals corresponding to sixteen lines in the sub-scanning direction for each of the pixels arrayed in the main scanning direction. The averaging is performed to suppress random fluctuation, for example, light shot noises.

The brightness levels given before the white shading are not even at the pixels arrayed in the main scanning direction due to, for example, the variation in sensitivity or unevenness in light amount distribution of the light-receiving elements. Thus, the shading portion 307 compares the averaged brightness level of each pixel with a preset target level, and stores a ratio of the brightness level to the target level in a memory (not shown) provided in the shading portion 307. The shading portion 307 performs this operation on the pixels (7,500 pixels) for each of the three colors. Specifically, after the white shading is completed, a ratio of the brightness level of the 7,500 pixels for each of the three colors to the target can be obtained.

The ratios to the target correspond to shading data pieces obtained by the white shading, and are expressed as WRn, WGn, and WBn ("n" corresponds to a position of the pixel in the main scanning direction) for respective colors.

At the time of reading the original, the shading portion 307 performs the processing with respect to the input image signals in accordance with the following expressions to correct the variation in sensitivity of the light-receiving elements, thereby suppressing the variation in brightness level of the pixels arrayed in the main scanning direction. The shading portion 307 transmits image signals (output data) having been subjected to shading to the image processor 308. In the following expressions, pixel signals for the pixels in the main scanning direction included in the image signals are represented by PRn, PGn, and PBn ("n" corresponds to a position of the pixel in the main scanning direction).

Output data for $R=(PRn-DRn)\times(1/WRn)$

Output data for $G=(PGn-DGn)\times(1/WGn)$

Output data for $B=(PBn-DBn)\times(1/WBn)$ (Image Reading Processing)

Figure 7:
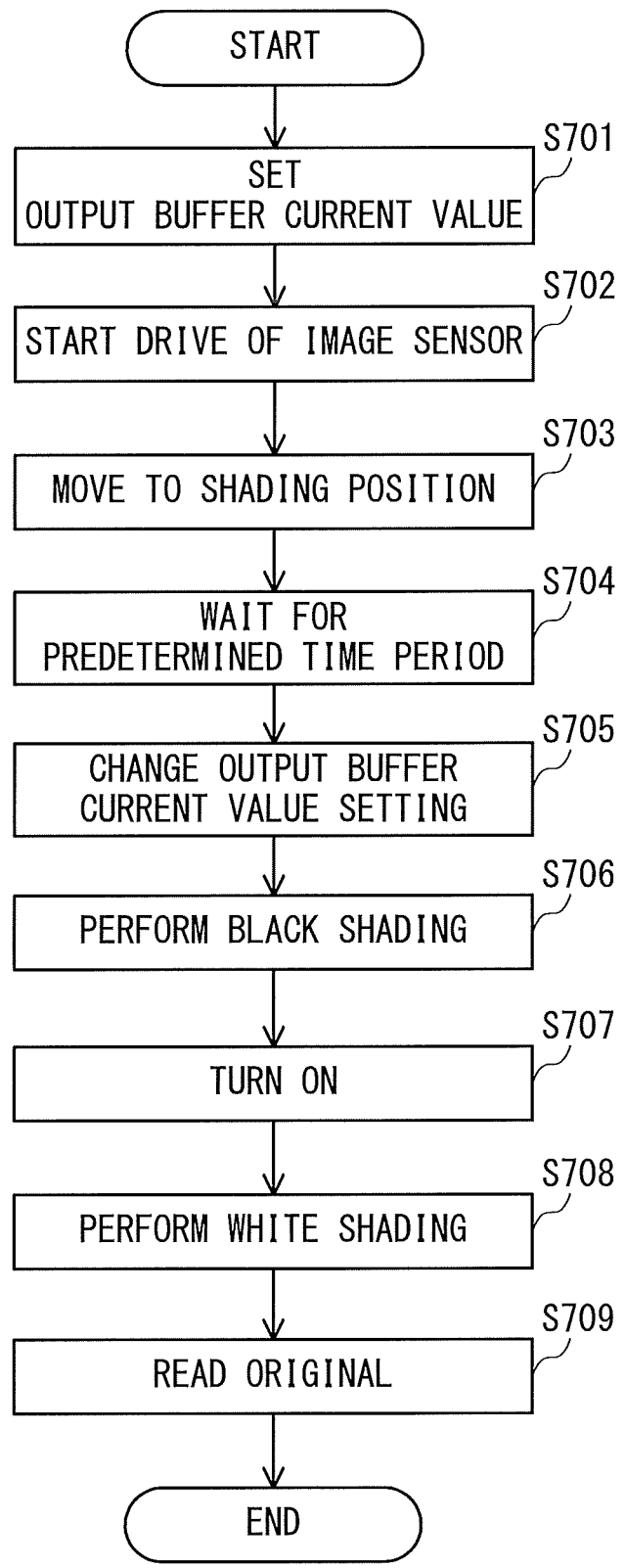
FIG. 7 is a flowchart for illustrating image reading processing.

FIG. 7 is a flowchart for illustrating the image reading processing, which is performed by the image reading apparatus 1 having the configuration described above, for the original 101 placed on the platen glass 102. This processing is started when a user places the original 101 on the platen glass 102 and operates the operation unit 301 to input the reading start instruction for the original image.

When the reading start instruction is received, the CPU 304 transmits a current switching instruction to the image sensor 209 so as to allow each of currents of the output buffers 403R, 403G, and 403B to have a predetermined value (Step S701). The image sensor 209 sets each of the currents of the output buffers 403R, 403G, and 403B to have a predetermined value through use of the current switching unit 404 in accordance with the current switching instruction. In this embodiment, the predetermined value corresponds to a maximum value of each of the currents which can flow through the output buffers 403R, 403G, and 403B. The CPU 304 drives image sensor 209 (Step S702). The rise in temperature of the image sensor 209 becomes maximum immediately after the drive of the sensor 209. In this embodiment, the currents of the output buffers 403R, 403G, and 403B are set to be maximum. Thus, the power consumption of the image sensor 209 is increased, and hence the temperature rises faster than normal. As described above, in this embodiment, during a preparation period before reading the white reference plate 216, the image sensor 209 is driven with high power to cause the temperature to rise rapidly.

Under the state in which the image sensor 209 is driven, the CPU 304 uses the scan motor 302 to move the reader 105 to a position at which the white reference plate 216 for shading can be read (Step S703). The CPU 304 stops the reader 105 at the position at which the white reference plate 216 can be read, and then waits for a predetermined time period, which is 200 milliseconds, from the stop of the reader 105 (Step S704). The reader 105 finely vibrates for a while after stopping. With the waiting time of 200 milliseconds, the reader 105 is reduced in vibration to be brought into a stable state.

Due to the processing of Step S701 to Step S704, a time period of equal to or longer than 200 milliseconds has elapsed from the start of the drive of the image sensor 209 at the maximum current. Thus, the temperature of the image sensor 209 is brought close to a saturated state.

The CPU 304 changes the currents of the output buffers 403R, 403G, and 403B of the image sensor 209, which have each been set to the predetermined value (maximum value in this embodiment) in Step S701, to a normal-time value smaller than the predetermined value (Step S705). The shading correction and the image reading can be performed while maintaining each of the currents of the output buffers 403R, 403G, and 403B at the predetermined value (maximum value in this embodiment). However, in such case, the power consumption increases. Therefore, before the shading correction and the image reading are performed, the currents of the output buffers 403R, 403G, and 403B are each reduced to a normal current value. Even when the current values of the output buffers 403R, 403G, and 403B are reduced, the saturated temperature does not rapidly decreases, and is maintained in a substantially stable state. It is only required that the predetermined value of the current set by the processing in Step S701 be larger than a value (normal value) of the current changed by the processing in Step S705.

After changing the current values of the output buffers 403R, 403G, and 403B to the normal values, the CPU 304 performs the black shading (Step S706). After performing the black shading, the CPU 304 turns on the light emitter 208 of the reader 105 (Step S707). After turning on the light emitter 208, the CPU 304 performs the white shading (Step S708). Subsequently to the shading, while moving the reader 105 in the sub-scanning direction through use of the scanning motor 302, the CPU 304 reads an original image of the original 101 placed on the platen glass 102 through use of the reader 105 (Step S709). With the above-mentioned processing, the image reading apparatus 1 terminates the reading processing for the original image of the original 101 placed on the platen glass 102.

Figure 8:
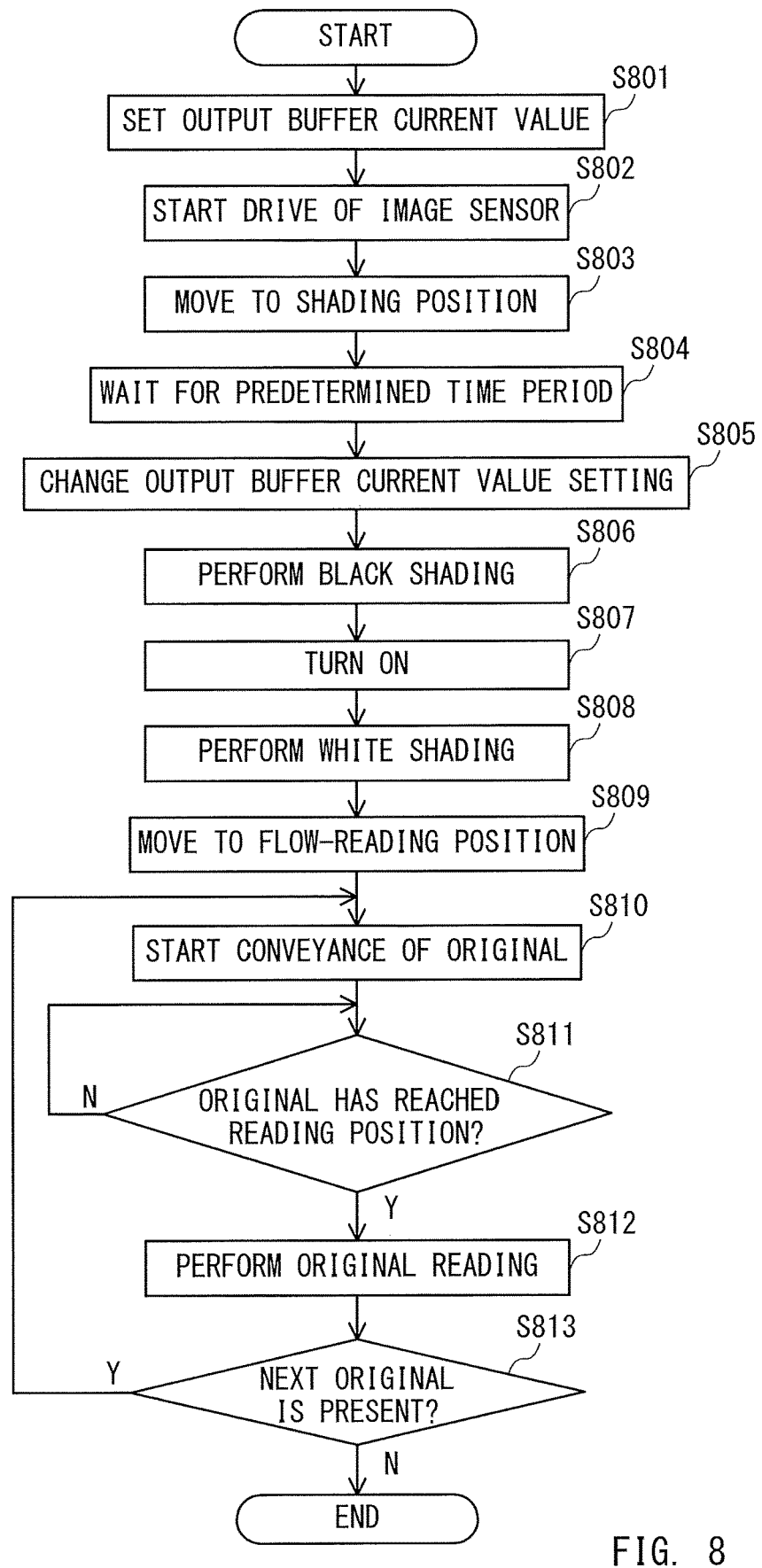
FIG. 8 is a flowchart for illustrating image reading processing.

FIG. 8 is a flowchart for illustrating the image reading processing, which is performed by the image reading apparatus 1, for the original 101 placed on the tray 201. This processing is started when a user places the original 101 on the tray 201 and operates the operation unit 301 to input the reading start instruction for the original image.

Similarly to the processing in FIG. 7, with each of the current values of the output buffer 403R, 403G, and 403B of the image sensor 209 set to the predetermined value (maximum value in this embodiment), the CPU 304 moves the reader 105 to a position at which the white reference plate 216 for shading can be read (Step S801 to Step S803). The CPU 304 stops the reader 105 at the position at which the white reference plate 216 can be read, and waits for a predetermined time period (200 milliseconds in this embodiment) from the stop of the reader 105 at the position at which the white reference plate 216 can be read. After that, the CPU 304 changes each of the currents of the output buffers 403R, 403G, and 403B from the predetermined value to a normal-time value, which is smaller than the predetermined value (Step S804 and Step S805).

As described above, the shading correction and the image reading can be performed while maintaining each of the currents of the output buffers 403R, 403G, and 403B at the predetermined value. However, in such case, the power consumption increases. Therefore, before the shading correction and the image reading are performed, the currents of the output buffers 403R, 403G, and 403B are each reduced to the normal current value, which is smaller than the predetermined value. In particular, in the processing of FIG. 8, there is a case in which original images are successively read from a plurality of originals 101 placed on the tray 201. In this case, the time period for the reading processing becomes longer. Therefore, the effect of suppressing the power consumption by reducing each of the currents of the output buffers 403R, 403G, and 403B to a normal current value becomes greater.

After changing the current values of the output buffers 403R, 403G, and 403B, the CPU 304 performs the black shading, turns on the light emitter 208, and performs white shading (Step S806, Step S807, and Step S808). After terminating the shading correction, the CPU 304 uses the scan motor 302 to move the reader 105 to the position at which the original image of the original 101 conveyed to the reading position A can be read (flow reading position) (Step S809). The CPU 304 uses the conveyance motor 303 to start conveying the originals 101 one after another from the tray 201 (Step S810).

Based on a detection result given by the original-leading-edge detection sensor 211, the CPU 304 determines whether or not the original 101 has reached the reading position A (Step S811). The CPU 304 acquires the detection result, which indicates that the leading edge of the original 101 has been detected, from the original-leading-edge detection sensor 211, to thereby determine that the original 101 has reached the reading position A. When the original 101 has reached the reading position A (Step S811: Y), the CPU 304 uses the reader 105 to read the original image of the original 101 being conveyed through the reading position A (Step S812).

After reading the original image, the CPU 304 determines whether or not the next original 101 is present on the tray 201 (Step S813). On the tray 201, there is provided, for example, a sensor configured to detect the presence or absence of the original placed on the tray 201. Based on the detection result given by the sensor, the CPU 304 is capable of determining whether or not the next original 101 is present on the tray 201. When the next original 101 is present on the tray 201 (Step S813: Y), the CPU 304 performs a reading operation for the next original 101 (Step S810 to Step S812). When the next original 101 is not present on the tray 201 (Step S813: N), the CPU 304 terminates the reading processing for the original image of the original 101 placed on the tray 201.

Figure 9:
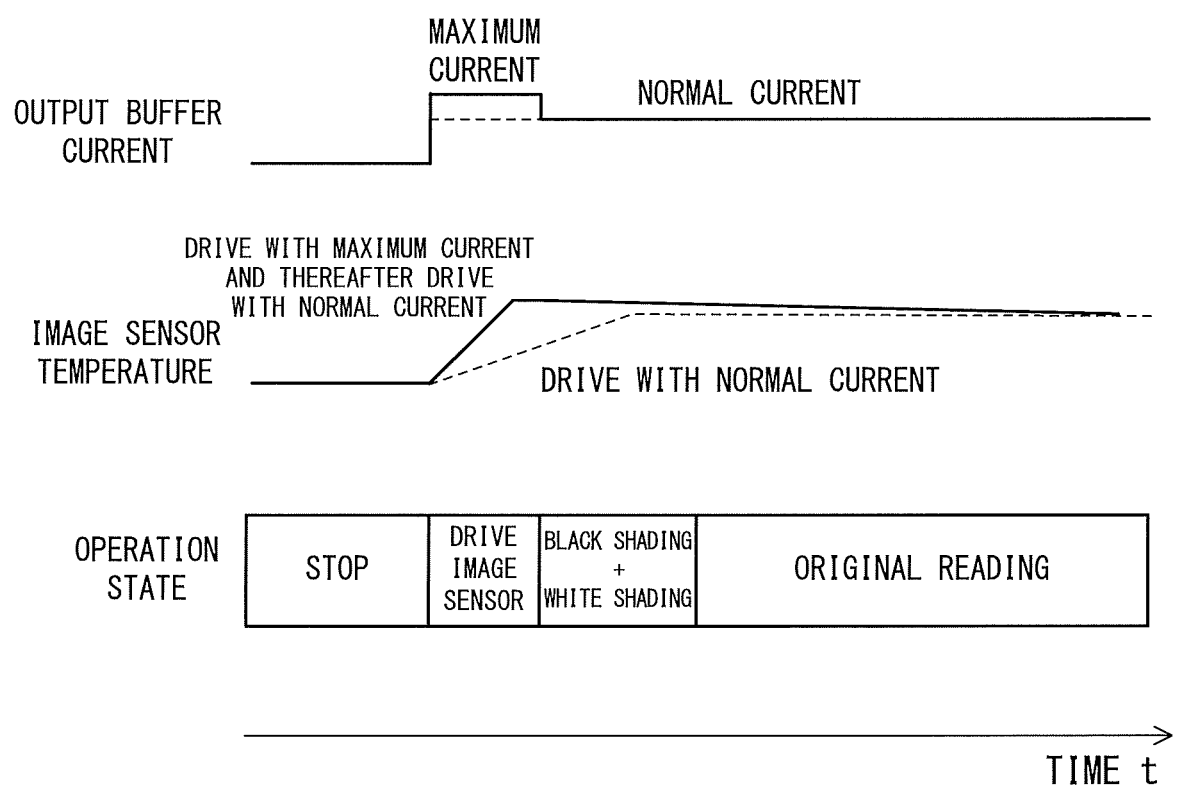
FIG. 9 is an explanatory diagram for illustrating temperature transition of the image sensor.

FIG. 9 is an explanatory diagram for illustrating temperature transition of the image sensor 209 in the image reading processing described with reference to FIG. 7 and FIG. 8.

When the image sensor 209 is driven with a predetermined current value (maximum current in this embodiment), the temperature rapidly rises immediately after the drive of the image sensor 209. Thus, the temperature of the image sensor 209 is saturated before the shading processing is performed. As described above, at the time of starting the image reading processing, the image sensor 209 is driven with the predetermined value (maximum current). After that, the image sensor 209 is driven with a normal current and is to be used for the shading processing and the image reading processing. Therefore, the temperature of the image sensor 209 is substantially the same at the time of performing the shading and at the time of reading the original. Thus, the influence of the temperature characteristics of the image sensor 209 is suppressed.

When the image sensor 209 is always driven with the normal current as indicated by the broken line in FIG. 9, the temperature of the image sensor 209 is not saturated before the start of the shading processing, and hence the temperature is different at the time of performing the shading and at the time of performing the original reading. Therefore, the dark level or the sensitivity of each of the light-receiving elements changes between the time of performing the shading and the time of performing the original reading due to the temperature characteristics of the image sensor 209. As a result, accurate shading correction is not performed. This may cause image degradation.

In this embodiment, the image sensor 209 is driven with the predetermined current value (maximum current) to promptly stabilize the temperature, thereby reducing the difference in temperature of the image sensor 209 between the time of performing the shading and the time of original reading. With this, the shading correction can be performed while suppressing the influence of the temperature characteristics of the image sensor 209, thereby being capable of reducing the degradation of the image. As described above, according to the present disclosure, the degradation in image quality of the read image due to the temperature fluctuation can be suppressed.

As described above, the value (predetermined value) of the current caused to flow through the output buffers 403R, 403G, and 403B of the image sensor 209 before the start of the drive is not limited to the maximum current as long as the current is larger than the current given at the time of normal original reading. Moreover, in this embodiment, the current of each of the output buffers 403R, 403G, and 403B is switched. However, it is only required that the power consumption of the image sensor 209 can be increased. For example, consumed current of the light-receiving elements of the image sensor 209 and currents of other buffers provided inside the image sensor 209 may be switched. Moreover, it is not always required that the reader 105 have the configuration in which the light emitter 208 and the image sensor 209 are integrated with each other. That is, the image sensor 209 may be fixed at a predetermined position in the apparatus main body 100, and the light emitter 208 may be movable by the scan motor 302.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-036336, filed Mar. 1, 2018 which is hereby incorporated by reference herein in its entirety.

What is claimed is:

1. An image reading apparatus, comprising:
a light source configured to irradiate an original with light;
an image sensor configured to receive light reflected on the original and output an image signal representing an original image of the original;
a reference member for shading correction;
a shading portion configured to perform the shading correction on the image signal through use of shading data acquired from a result of reading the reference member with the image sensor;
a power consumption controller configured to control power consumption of the image sensor; and
a controller configured to control operations of the light source and the image sensor to read the reference member and an original image of the original,
wherein the controller is configured to:
cause the power consumption controller to drive the image sensor with a first power consumption during a preparation period before the controller causes the image sensor to read the reference member and thereafter drive the image sensor with a second power consumption smaller than the first power consumption, and allow the image sensor driven with the second power consumption to read the reference member; and
cause the image sensor driven with the second power consumption to read an original image of the original.

2. The image reading apparatus according to claim 1, wherein the controller is configured to cause the power consumption controller to drive the image sensor with the first power consumption only for a predetermined time period during the preparation period and thereafter drive the image sensor with the second power consumption.

3. The image reading apparatus according to claim 1, further comprising:
a reading unit including the light source; and
a moving unit configured to move the reader,
wherein the controller is configured to cause the power consumption controller to drive the image sensor with the first power consumption during the preparation period to allow the moving unit to move the reading unit to a position of reading the reference member, and thereafter cause the power consumption controller to drive the image sensor with the second power consumption.

4. The image reading apparatus according to claim 3, further comprising a platen glass configured to receive the original to be placed thereon,
wherein, after the image sensor read the reference member, the controller causes the image sensor to read an original image of the original placed on the platen glass while causing, by the controller, the moving unit to move the reading unit below the platen glass.

5. The image reading apparatus according to claim 3, further comprising a conveyor configured to successively convey a plurality of originals,
wherein, after the image sensor read the reference member, the controller causes the moving unit to move the reading unit to a position to which the original is conveyed by the conveyor, and causes the image sensor to read an original image of the original being conveyed.

6. The image reading apparatus according to claim 1, wherein the controller is configured to cause the power consumption controller to drive the image sensor with the first power consumption for 200 milliseconds and thereafter drive the image sensor with the second power consumption.

7. The image reading apparatus according to claim 1, wherein the image sensor includes:
a plurality of light-receiving elements configured to receive light; and
an output buffer configured to convert each of electric charges output from the plurality of light-receiving elements into a voltage to generate the image signal, and
wherein the power consumption controller is configured to switch an output current of the output buffer to control power consumption of the image sensor.

8. The image reading apparatus according to claim 7, wherein the controller is configured to cause the power consumption controller to set the output current of the output buffer to a predetermined value, and thereafter cause the power consumption controller to reduce the output current of the output buffer to be smaller than the predetermined value.

9. The image reading apparatus according to claim 7, wherein the controller is configured to cause the power consumption controller to set the output current of the output buffer to be maximum, and thereafter cause the power consumption controller to reduce the output current of the output buffer.

10. An image reading method to be performed by an image reading apparatus including:
a reading unit including:
a light source configured to irradiate an original with light; and
an image sensor configured to receive light reflected on the original and output an image signal representing an original image of the original;
a reference member to be used for shading correction; and
a controller,
wherein the image reading method is performed by the controller, and the image reading method comprising:
driving the reading unit with a first power consumption during a preparation period before the controller causes the reading unit to read the reference member and thereafter driving the reading unit with a second power consumption smaller than the first power consumption;
allowing the reading unit driven with the second power consumption to read the reference member;
generating shading data to be used for the shading correction based on a result of reading the reference member;
causing the reading unit driven with the second power consumption to read the original; and
performing shading correction on a result of reading the original based on the shading data to generate image data representing an original image of the original.

11. The image reading method according to claim 10, further comprising driving, by the controller, the reading unit with the first power consumption only for a predetermined time period during the preparation period, and thereafter driving the reading unit with the second power consumption.

12. The image reading method according to claim 10, wherein the image reading apparatus further includes a moving unit configured to move the reader, and
wherein the image reading method further comprises driving, by the controller, the reading unit with the first power consumption during the preparation period to allow the moving unit to move the reading unit to a position of reading the reference member, and thereafter driving the reading unit with the second power consumption.

13. The image reading method according to claim 12, wherein the image reading apparatus further includes a platen glass configured to receive the original to be placed thereon, and
wherein the image reading method further comprises causing, by the controller, after the reading unit read the reference member, the reading unit to read an original image of the original placed on the platen glass while causing, by the controller, the moving unit to move the reading unit below the platen glass.

14. The image reading method according to claim 12, wherein the image reading apparatus further includes a conveyor configured to successively convey a plurality of originals, and
wherein the image reading method further comprises causing, by the controller, after the reading unit read the reference member, the moving unit to move the reading unit to a position to which the original is conveyed by the conveyor, and causing the reading unit to read an original image of the original being conveyed.

15. The image reading method according to claim 10, further comprising driving, by the controller, the reading unit with the first power consumption for 200 milliseconds, and thereafter driving the reading unit with the second power consumption.

16. The image reading method according to claim 10, wherein the image sensor includes:
a plurality of light-receiving elements configured to receive light; and
an output buffer configured to convert each of electric charges output from the plurality of light-receiving elements into a voltage to generate the image signal, and
wherein the image reading method comprises switching, by the controller, an output current of the output buffer to control power consumption of the reader.

17. The image reading method according to claim 16, further comprising setting, by the controller, the output current of the output buffer to a predetermined value, and thereafter reducing the output current of the output buffer to be smaller than the predetermined value.

18. The image reading method according to claim 16, further comprising setting, by the controller, the output current of the output buffer to be maximum, and thereafter reducing the output current of the output buffer.

* * * * *